United States Patent
Moon et al.

(10) Patent No.: US 8,644,115 B2
(45) Date of Patent: Feb. 4, 2014

(54) HYDROPHONE AND PRESSURE BALANCING DEVICE FOR USING FOR HYDROPHONE

(75) Inventors: Wonkyu Moon, Pohang-si (KR); Haksue Lee, Cheongju-si (KR); Sungjoon Choi, Pohang-si (KR)

(73) Assignee: Postech Academy-Industry Foundation, Pohang (KR)

(*) Notice: Subject to any disclaimer, the term of this patent is extended or adjusted under 35 U.S.C. 154(b) by 404 days.

(21) Appl. No.: 12/983,928

(22) Filed: Jan. 4, 2011

(65) Prior Publication Data

US 2012/0170422 A1     Jul. 5, 2012

(51) Int. Cl.
*G01K 11/00*     (2006.01)
*H04R 17/00*     (2006.01)
*G01L 9/00*      (2006.01)
*G01D 9/00*      (2006.01)

(52) U.S. Cl.
USPC ........... 367/172; 367/171; 367/174; 367/141; 367/167; 73/650; 73/749; 310/337; 285/228; 285/900

(58) Field of Classification Search
USPC .............. 367/140–191; 73/650, 749; 310/337
See application file for complete search history.

(56) References Cited

U.S. PATENT DOCUMENTS

| | | | | | |
|---|---|---|---|---|---|
| 4,433,400 | A | * | 2/1984 | DeReggi et al. | 367/163 |
| 4,695,988 | A | * | 9/1987 | Banno | 367/154 |
| 4,803,671 | A | * | 2/1989 | Rochling et al. | 367/166 |
| 4,926,398 | A | * | 5/1990 | Fincher | 367/172 |
| 5,033,032 | A | * | 7/1991 | Houghtaling | 367/160 |
| 5,339,290 | A | * | 8/1994 | Greenstein | 367/163 |
| 6,151,277 | A | * | 11/2000 | Erath et al. | 367/173 |
| 7,449,821 | B2 | * | 11/2008 | Dausch | 310/364 |
| 7,526,148 | B2 | * | 4/2009 | Kilic et al. | 385/12 |
| 2011/0178438 | A1 | * | 7/2011 | Van Gerwen | 600/587 |

* cited by examiner

*Primary Examiner* — Isam Alsomiri
*Assistant Examiner* — Hovhannes Baghdasaryan
(74) *Attorney, Agent, or Firm* — Lexyoume IP Meister, PLLC

(57) ABSTRACT

A sound sensor, a hydrophone including the sound sensor, and a pressure balancing device for using for the hydrophone are provided. The hydrophone includes: a sensor including a sensing part and a pressure balancing part; a printed circuit board (PCB) that is electrically connected to the sensor; a case that houses the sensor and the PCB and that has an opening at one side thereof; an elastic membrane that covers the opening of the case; and a signal line that is electrically connected to the PCB to be extended to the outside of the case. The pressure balancing part includes a diaphragm of a thin film and a support that supports the diaphragm. A pressure balancing hole is formed at one side of the pressure balancing part, and at the inside of the pressure balancing part, a channel that is connected to the pressure balancing hole is formed, and a compressible gas is filled in the channel.

16 Claims, 17 Drawing Sheets

HYDROPHONE AND PRESSURE BALANCING DEVICE FOR USING FOR HYDROPHONE

BACKGROUND OF THE INVENTION (a) Field of the Invention

The present invention relates to a hydrophone and a pressure balancing device for using for the hydrophone. More particularly, the present invention relates to a hydrophone including a piezoelectric element and a pressure balancing device for using for the hydrophone.

(b) Description of the Related Art

Under water, a water pressure changes according to a depth, and when the depth of water does not change, a water pressure does not change, and this is called a 'hydrostatic pressure'. However, a sound wave under water changes a pressure by allowing a water particle to generate a vibration of compression waves through a medium of water, and this is called a 'hydrodynamic pressure'.

A hydrophone is a device that detects sound by detecting a pressure change under water, i.e., a dynamic pressure and converts a voice generating under water to an electrical signal, thereby detecting sound. The hydrophone is designed to detect a wave motion of a frequency from several Hz to several kHz to be widely used as a core part of a sound navigation and ranging (SONAR). Further, the hydrophone may be used in an underwater communication system that uses a high frequency of several tens to several hundreds kHz.

Commercial hydrophones are generally manufactured by mechanically coupling many parts including a piezoelectric element such as piezoelectric ceramic or a piezoelectric polymer such as polyvinylidene fluoride (PVDF), and much time and cost are consumed in manufacturing the commercial hydrophones, and an application range thereof may be limited according to a size thereof.

When manufacturing a sound sensor of a hydrophone using a micro processing technology method such as a microelectromechanical system (MEMS), a production time and cost of the sensor can be reduced, and nowadays, in order to reduce a manufacturing time and cost, a research of a micro sound/ultrasonic wave sensor that can be used for a hydrophone is widely performed.

However, when a hydrophone is manufactured in a micro size, a problem that a sensitivity is deteriorated in a low frequency range may occur. Particularly, when a piezoelectric element is used, generating charges are not enough due to the piezoelectric element in a low frequency band and thus a sensitivity may be deteriorated due to high electrical impedance and electrical noise of an amplifier. Further, when a sensitive portion of the hydrophone is manufactured in a thin film form, the sensitive portion may be weak to an increasing pressure, i.e., a constant pressure according to the increase of the depth of water.

Accordingly, development of a hydrophone having a structure that can withstand a high pressure while increasing a sensitivity of the hydrophone is requested.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a hydrophone having advantages of capable of using in a high pressure and preventing deterioration of a sensitivity.

The present invention has been made in an effort to further provide a pressure balancing device having advantages of allowing a hydrophone to withstand in a high pressure.

An exemplary embodiment of the present invention provides a hydrophone including: a sensor including a sensing part and a pressure balancing part; a printed circuit board (PCB) that is electrically connected to the sensor; a case that houses the sensor and the PCB and that has an opening at one side thereof; an elastic membrane that covers the opening of the case; and a signal line that is electrically connected to the PCB to be extended to the outside of the case. The pressure balancing part includes a diaphragm of a thin film and a support that supports the diaphragm, a pressure balancing hole is formed at one side of the pressure balancing part, and at the inside of the pressure balancing part, a channel that is connected to the pressure balancing hole is formed. The PCB partitions the inside of the case into a first space at which the sensing part of the sensor is disposed and a second space to which the signal line is connected. A compressible gas is filled in the channel, and a first incompressible fluid and a second incompressible fluid are filled at the first space and the second space, respectively.

The compressible gas may be air.

The first incompressible fluid may be a non-conductive liquid.

The first incompressible fluid may be castor oil.

The second incompressible fluid may be distilled water (DI water).

At the inside of the pressure balancing part, a chamber may be formed at a position corresponding to the piezoelectric element, the channel may connect the chamber and the pressure balancing hole, and the compressible gas may be filled in the chamber.

The channel may be formed in a spiral form that winds a periphery of the chamber.

The chamber may include a main chamber and at least one auxiliary chamber, the channel may connect the main chamber, the at least one auxiliary chamber, and the pressure balancing hole, and the piezoelectric element may be positioned to correspond to the main chamber.

The sensing part may include a piezoelectric element that is disposed on the diaphragm and an electrode that is connected to the piezoelectric element, and the electrode may be separated with the piezoelectric element interposed therebetween to contact with an upper surface and a lower surface, respectively, of the piezoelectric element.

The electrode of the sensing part may be electrically connected to the PCB.

The diaphragm may include a silicon layer.

The diaphragm may include a silicon oxide film that is formed at both surfaces of the silicon layer.

A radius of the channel may satisfy the following Equation.

$$\rho_b g R^2 / \sigma < 1$$

where $\rho_b$ is a density of the second incompressible fluid, g is acceleration of gravity, and $\sigma$ is a surface tension of the second incompressible fluid.

The elastic membrane may be formed with silicon rubber.

An auxiliary membrane may be formed at a periphery of the PCB.

The sensing part and the pressure balancing part may be integrally formed.

Another embodiment of the present invention provides a pressure balancing device including: a diaphragm of a thin film; and a support that supports the diaphragm. A pressure balancing hole that injects an incompressible fluid is formed at one side of the support, a channel that is connected to the pressure balancing hole is formed at the inside of the support, and a compressible gas may be filled in the channel.

The compressible gas may be air.

A chamber may be formed at the inside of the support, the channel may connect the chamber and the pressure balancing hole, and the compressible gas may be filled in the chamber.

The chamber may include a main chamber and at least one auxiliary chamber, and the channel may connect the main chamber, the at least one auxiliary chamber, and the pressure balancing hole.

According to an exemplary embodiment of the present invention, a piezoelectric thin film type sensor can be used as a hydrophone for detecting a sound wave under water.

Further, by using a pressure balancing device in which a compressible gas is filled, a hydrophone can be suppressed from being damaged under a high pressure.

DETAILED DESCRIPTION OF THE EMBODIMENTS

Figure 1:
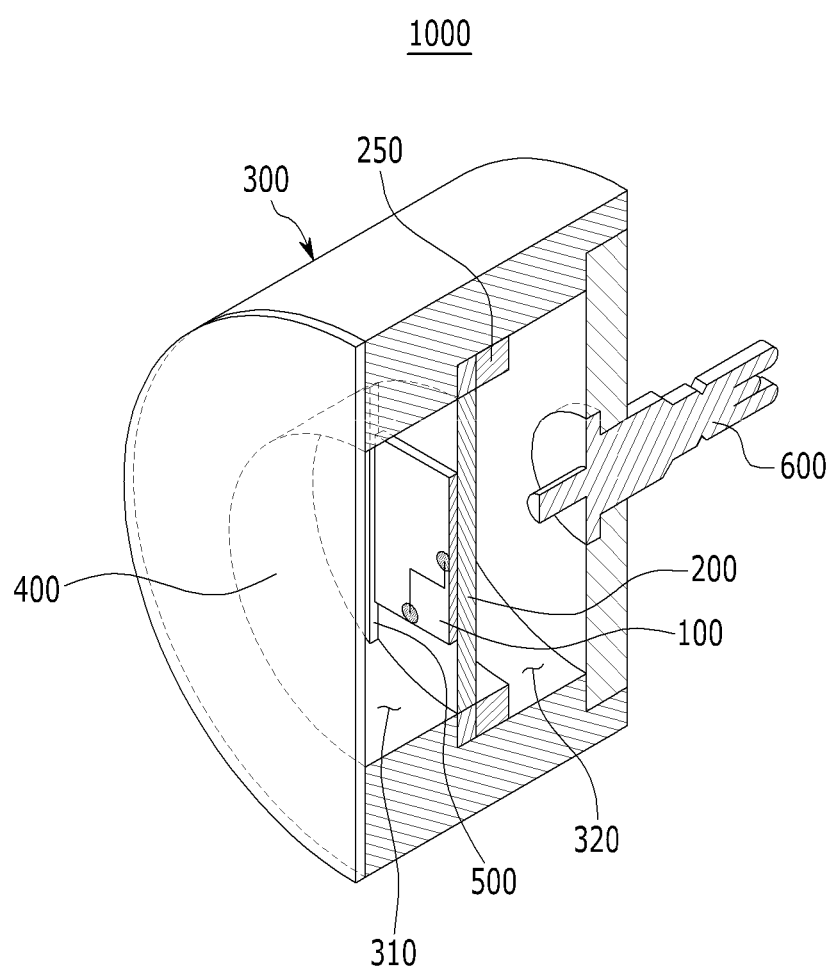
FIG. 1 is a cross-sectional perspective view of a hydrophone according to a first exemplary embodiment of the present invention.

The present invention will be described more fully hereinafter with reference to the accompanying drawings, in which exemplary embodiments of the invention are shown.

The drawings and description are to be regarded as illustrative in nature and not restrictive. Like reference numerals designate like elements throughout the specification. Further, in the drawings, a size and thickness of each element are randomly represented for better understanding and ease of description, and the present invention is not limited thereto.

FIG. 1 is a cross-sectional perspective view of a hydrophone according to a first exemplary embodiment of the present invention and hereinafter, a hydrophone 1000 according to the present exemplary embodiment will be described with reference to FIG. 1.

Referring to FIG. 1, the hydrophone 1000 according to the present exemplary embodiment includes a sensor 100, a PCB 200, a case 300 that houses the sensor 100 and the PCB 200, an elastic membrane 400 that closes and seals an opening that is formed at one side of the case 300, and a signal line 600 that is extended to the outside of the case 300. Here, the sensor 100 includes a sensing part that detects an acoustic pressure and a pressure balancing part that sustains a balance of pressures of the inside and outside of the sensor 100 and a detailed configuration thereof will be described later.

The PCB 200 is positioned at a lower part of the sensor 100 to be electrically connected to the sensor 100. Specifically, an electrode of the sensor 100 is connected to an electrode that is formed on the PCB 200 to transfer an electrical signal generating in the sensor 100 according to a pressure change to the PCB 200.

A PCB support 250 is formed in a lower part of the PCB 200 to support the PCB 200.

The sensor 100 and the PCB 200 are housed within the case 300. In this case, the case 300 is made of a transparent material such as acryl.

In the present exemplary embodiment, an opening is formed at one side of the case 300, and the elastic membrane 400 is formed to close and seal the opening of the case 300. As shown in FIG. 1, the elastic membrane 400 is formed at a position corresponding to the sensor 100 and is made of an elastic material such as silicon rubber to vibrate according to an external pressure, thereby performing a function of transferring an acoustic pressure to the inside of the case 300.

Internal space of the case 300 is partitioned into two spaces of the sensor 100 and the PCB 200. A first incompressible fluid is filled at a first space 310 at which the sensor 100 is disposed, and a second incompressible fluid is filled at a second space 320 at which the sensor 100 is not disposed. A non-conductive liquid is used as the first incompressible fluid that is filled at the first space 310, and in the present exemplary embodiment, castor oil is used. Distilled water (DI water) is used as the second incompressible fluid that is filled at the second space 320.

The first incompressible fluid and the second incompressible fluid perform a function of sustaining a pressure within the case 300 according to an external pressure, i.e., a constant pressure. Further, the first incompressible fluid transfers an acoustic pressure that is transferred from the outside through the elastic membrane 400 to the sensor 100 to allow the sensor 100 to detect the acoustic pressure, and the second incompressible fluid is connected to the pressure balancing part of the sensor 100 to allow to sustain a balance of pressures of the inside and outside of the sensor 100.

An auxiliary membrane 500 is attached to a periphery of the PCB 200 to securely separate the first space 310 and the second space 320, thereby preventing the non-conductive first incompressible fluid from mixing with the second incompressible fluid.

The signal line 600 is extended to the outside of the case 300 to perform a function of transferring an electric signal generating in the sensor 100 to the outside via the PCB 200. In this case, the signal line 600 is directly connected to the PCB 200 to transfer an electric signal.

As described above, the elastic membrane 400 transfers a change of an external pressure, i.e., an acoustic pressure to the first space 310 within the case 300. An acoustic pressure is transferred to a piezoelectric element of the sensor 100 through the first incompressible fluid, i.e., castor oil that is filled at the first space 310, and the acoustic pressure is detected through a current generating in the piezoelectric element. Further, by a method of injecting a part of the second incompressible fluid, i.e., distilled water that is filled at the second space 320 to sustain a constant pressure into the pressure balancing part of the sensor 100, a pressure of the inside and the outside of the sensor 100 is balanced.

By such a configuration, the hydrophone 1000 according to the present exemplary embodiment can detect an acoustic pressure without damage even in a high pressure environment, i.e., a deep depth of water by using the sensor 100 including a pressure balancing part in which a compressible gas is housed. Further, by filling a non-conductive and incompressible fluid within the case 300, an acoustic pressure can be detected.

Figure 2A:
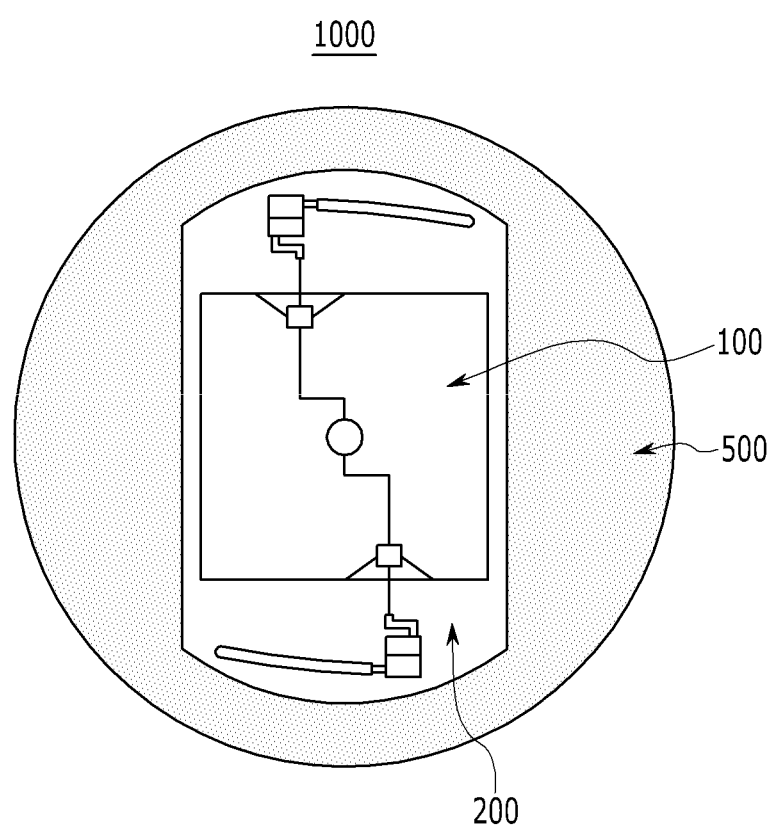
FIGS. 2A to 2C are diagrams sequentially illustrating a process of manufacturing a hydrophone according to a first exemplary embodiment of the present invention.
Figure 2B:
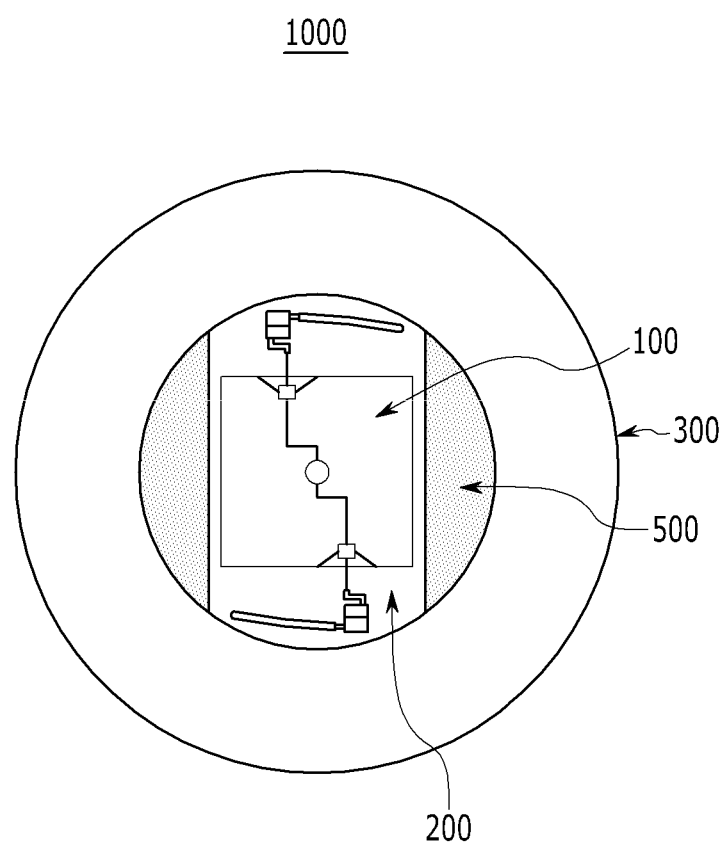
Figure 2C:
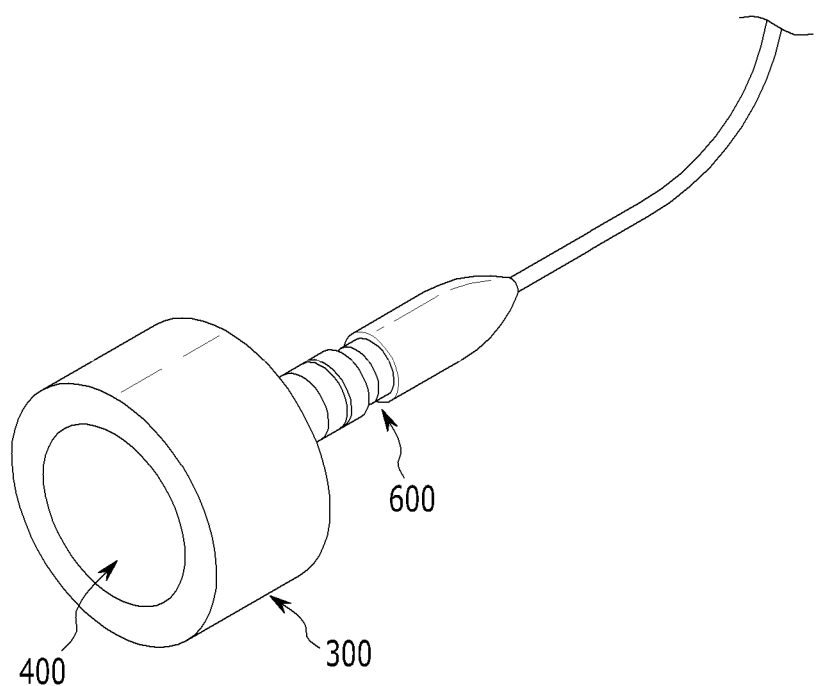

FIGS. 2A to 2C are diagrams sequentially illustrating a process of manufacturing a hydrophone according to a first exemplary embodiment of the present invention and hereinafter, a process of manufacturing a hydrophone according to the present exemplary embodiment will be described with reference to FIGS. 2A to 2C.

Referring to FIG. 2A, the PCB 200 is first prepared, and the sensor 100 and the auxiliary membrane 500 are attached to the PCB 200. In this case, an electrode of the sensor 100 and an electrode of the PCB 200 are connected by a wire. The wire that connects the electrodes can be formed with gold, and the electrodes can be surely connected using epoxy adhesives.

As described above, the auxiliary membrane 500 performs a function of separating a non-conductive first incompressible fluid and second incompressible fluid within the case 300.

Referring to FIG. 2B, the PCB 200 to which the sensor 100 and the auxiliary membrane 500 are attached is inserted and installed within the case 300. In this case, the PCB 200 is supported by the PCB support 250.

Thereafter, by connecting the signal line 600 to the electrode of the PCB 200, the signal line 600 is extended to the outside of the case 300, and the elastic membrane 400 is attached to an opening that is formed at one side of the case 300.

Referring to FIG. 2C, castor oil is filled at the first space 310 of the case 300, and DI water is filled at the second space 320 of the case 300. They can be injected through an injection hole that is formed in the case 300, and thereafter, they can be sealed through epoxy adhesives.

In this way, the hydrophone 1000 including the sensor 100 can be manufactured with a simple method.

Hereinafter, a configuration of the sensor 100 of the hydrophone 1000 according to the present exemplary embodiment will be described in detail.

Figure 3A:
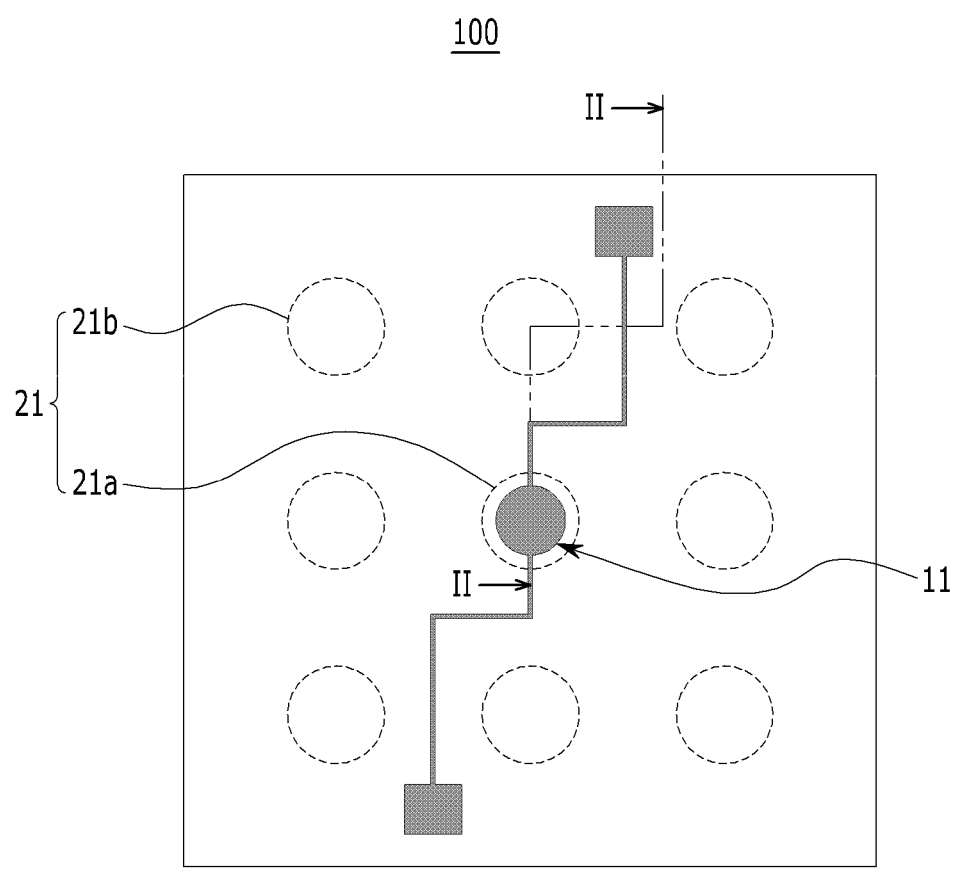
FIGS. 3A and 3B are a top plan view and a bottom view, respectively, of a sensor of a hydrophone according to a first exemplary embodiment of the present invention.
Figure 3B:
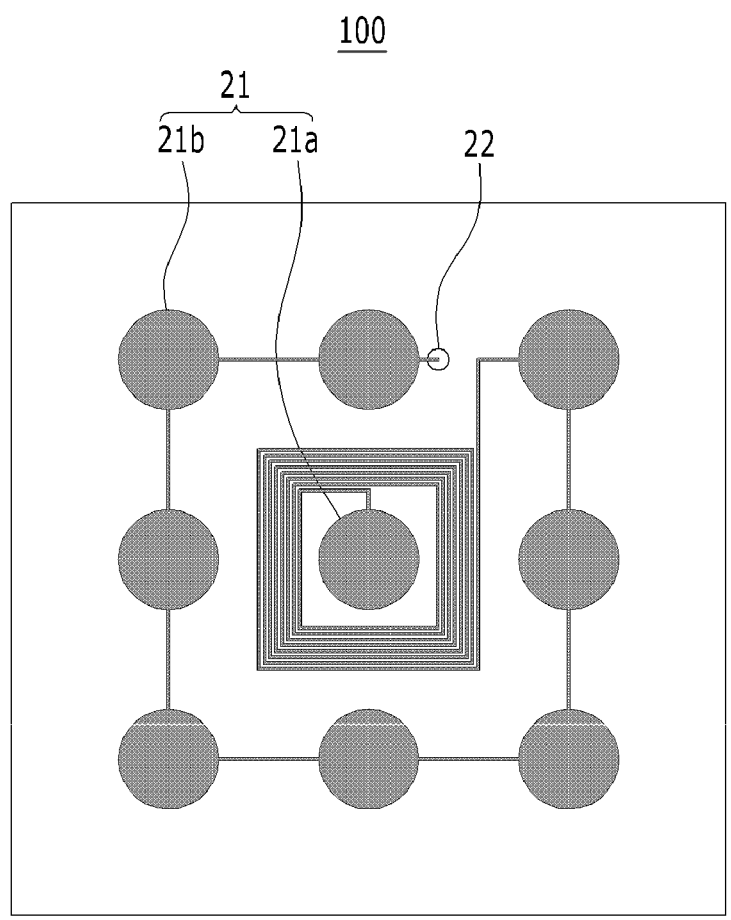
Figure 4:
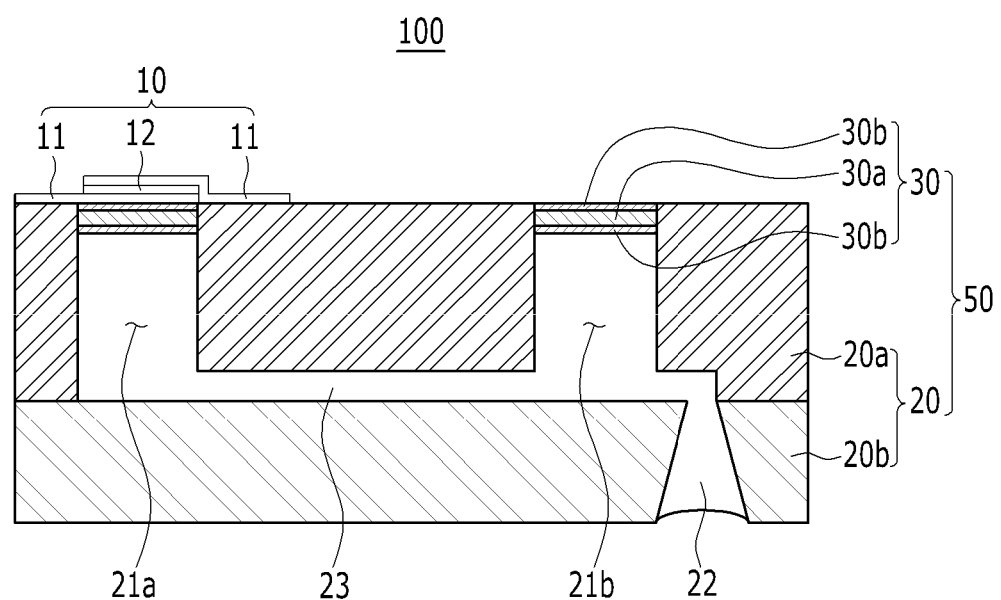
FIG. 4 is a cross-sectional view illustrating the sensor taken along line II-II of FIG. 3A.

FIGS. 3A and 3B are a top plan view and a bottom view, respectively, of a sensor according to a first exemplary embodiment of the present invention, and FIG. 4 is a cross-sectional view illustrating the sensor taken along line II-II of FIG. 3A.

Referring to FIGS. 3A, 3B, and 4, the sensor 100 according to the present exemplary embodiment includes a sensing part 10 including an electrode 11 and a piezoelectric element 12 and a pressure balancing part 50 including a diaphragm 30 and a support 20. The electrode 11 and the piezoelectric element 12 are connected to each other and are positioned on the diaphragm 30.

The diaphragm 30 is formed in a thin film including a silicon layer 30a, and silicon oxide films 30b are formed at both surfaces of the silicon layer 30a. Specifically, when the diaphragm 30 is formed, because a micro semiconductor process is used, the diaphragm 30 is formed in the silicon layer 30a, and in order to insulate the diaphragm 30 from the electrode 11, silicon oxide films 30b are formed at both surfaces thereof.

Referring to FIG. 4, the support 20 of the pressure balancing part 50 includes a first support 20a that supports the diaphragm 30 and a second support 20b in which the pressure balancing hole 22 is formed. Further, a chamber 21 and a channel 23 are formed within the support 20 of the pressure balancing part 50. In the present exemplary embodiment, the first support 20a is formed with silicon and the second support 20b is formed with glass, and the present invention is not limited thereto.

A depth of the chamber 21 is approximately equally formed with a thickness of the first support 20a. As described later, when the main chamber 21a is formed in a small size and the auxiliary chamber 21b is formed to have a large volume, it is advantageous when using the sensor 100 under a high pressure. However, a micro processing that forms the first support 20a in a small size has a technical limitation and in consideration of this, a thickness of the first support 20a is formed in a size of about 300 μm or more.

A size of the diaphragm 30, i.e., a radius and thickness of the diaphragm 30 are an important element in relation of a sensitivity of the sensor 100. As the diaphragm 30 has a large radius and a small thickness, a sensitivity of the sensor 100 is improved, but integrity thereof is deteriorated. However, as the diaphragm 30 has a small radius and a large thickness, integrity of the sensor 100 is improved, but a sensitivity is deteriorated.

When determining a size of the diaphragm 30, if the support 20 does not exist, a maximum constant pressure in which the diaphragm 30 can withstand is calculated. This is because when the pressure balancing part 50 is used, a pressure difference at both surfaces of the diaphragm 30 should not exceed a maximum constant pressure in which the diaphragm 30 can withstand.

A maximum constant pressure, i.e., a rupture pressure $P_r$ in which the diaphragm 30 can withstand is represented by Equation 1.

$$P_r = \frac{4}{3}\sigma_{r\_max}\left(\frac{t_s}{a}\right)^2 \quad \text{(Equation 1)}$$

where $\sigma_{r\_max}$ is a maximum radial stress of the diaphragm 30, and $t_s$ and a are a thickness and a radius, respectively, of the diaphragm 30. An influence by a piezoelectric element and an electrode is relatively small, and a thickness and stress thereof are not considered.

Figure 5:
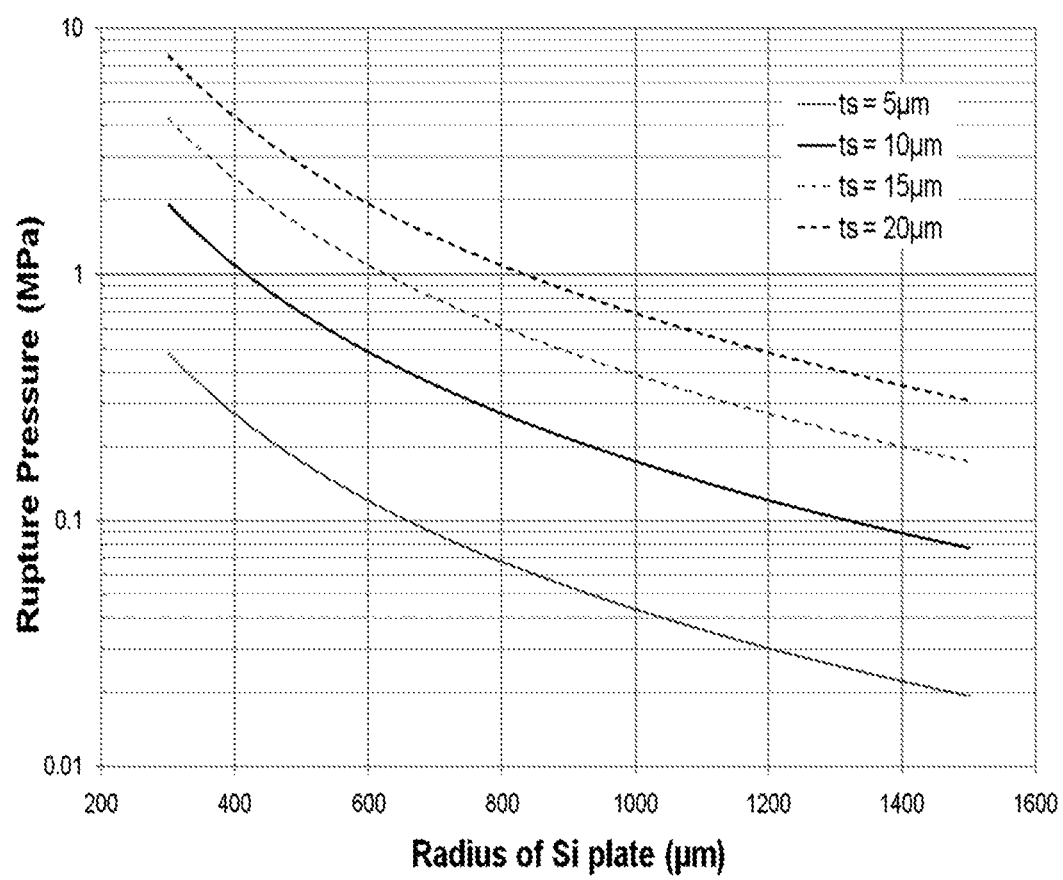
FIG. 5 is a graph illustrating a rupture pressure according to a thickness and radius of a diaphragm of a sensor in the first exemplary embodiment of the present invention.

FIG. 5 is a graph illustrating a rupture pressure according to a thickness and radius of a diaphragm in a first exemplary embodiment of the present invention, and referring to FIG. 5, it can be seen that as a diaphragm has a small thickness and a large radius, a rupture pressure decreases.

In FIG. 5, if a thickness of a diaphragm is about 10 μm and a radius thereof is about 600 μm to about 800 μm, a rupture pressure becomes about 3 times to about 5 times greater than an atmospheric pressure, i.e., about 0.3 MPa to about 0.5 MPa. This indicates that the diaphragm is fractured when a pressure difference between the inside and the outside of the diaphragm do not exceed about 0.3 MPa to about 0.5 MPa.

Figure 6:
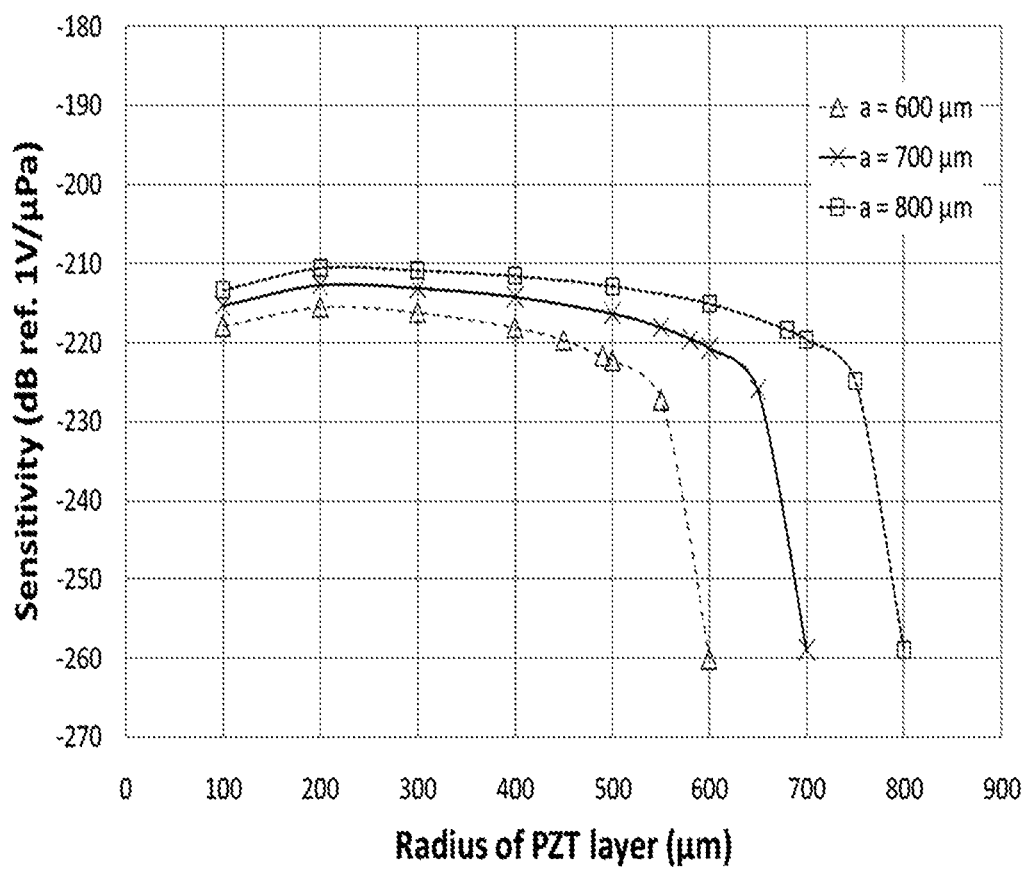
FIG. 6 is a graph illustrating a sensitivity of a sensor according to a radius of a diaphragm and piezoelectric element in an exemplary embodiment of the present invention.

FIG. 6 is a graph illustrating a sensitivity of a sensor according to a radius of a diaphragm and piezoelectric element in an exemplary embodiment of the present invention, and specifically, when a thickness of a diaphragm is 10 μm and each radius of a diaphragm is 600 μm, 700 μm, and 800 μm, a sensitivity of a sound wave of 500 Hz is measured.

Referring to FIG. 6, it can be seen that as a radius of the diaphragm increases, a sensitivity of a sensor improves. Further, it can be seen that as a radius of a piezoelectric element approaches a radius of a diaphragm, a sensitivity of a sensor is rapidly deteriorated. Therefore, it can be seen that a radius of a piezoelectric element should be smaller than that of a diaphragm.

In this way, a thickness and a radius of a diaphragm for improving a sensitivity of a sensor and a radius of a piezoelectric element can be optimized. For example, when a thickness and a radius of a diaphragm are 10 μm and 700 μm, respectively, and a radius of a piezoelectric element is 490 μm, a sensitivity of a sensor is about −216 dB.

Referring again to FIG. 4, as described above, at one side of the support 20 of the pressure balancing part 50, a pressure balancing hole 22 communicating with the outside of the sensor 100 is formed, and the chamber 21 is formed at the inside of the support 20 of the pressure balancing part 50. Further, at the inside of the support 20 of the pressure balancing part 50, the channel 23 that connects the pressure balancing hole 22 and the chamber 21 is formed.

The chamber 21 that is formed within the support 20 of the pressure balancing part 50 includes a main chamber 21$a$ and an auxiliary chamber 21$b$. Referring to FIGS. 3A and 3B, the main chamber 21$a$ is formed in a central part of the sensor 100, and eight auxiliary chambers 21$b$ are formed at a periphery of the main chamber 21$a$. The channel 23 is connected from the main chamber 21$a$ to the pressure balancing hole 22 via each auxiliary chamber 21$b$.

As shown in FIG. 4, the electrode 11 and the piezoelectric element 12 are disposed on the diaphragm 30 of the pressure balancing part 50.

The piezoelectric element 12 is disposed between the electrodes 11 and thus positive charges and negative charges generate at each of both surfaces by an external pressure. The piezoelectric element 12 is formed by coating using a sol-gel process and a method such as screen printing.

A current flows to the electrode 11 by charges generating in the piezoelectric element 12, and the electrode 11 is connected to an external circuit to transfer a signal. A charge generating amount changes according to an external pressure change amount and thus because a signal that is transferred to an external circuit changes, an external pressure change, i.e., an acoustic pressure can be detected.

In this way, the sensor 100 that detects an acoustic pressure under water can be embodied using the sensing part 10 including the piezoelectric element 12 and the pressure balancing part 50.

As described above, in order to detect an acoustic pressure under water, the sensor 100 should be able to withstand a high constant pressure under water, and in order to detect an acoustic pressure smaller than a constant pressure, the sensor 100 should have a high sensitivity.

For this purpose, in the present exemplary embodiment, a compressible gas is filled in the chamber 21 and the channel 23. In the present exemplary embodiment, air is used as a compressible gas that is filled in the chamber 21 and the channel 23 and hereinafter, a process in which the diaphragm 30 is deformed in the sensor 100 in which air is filled at the inside thereof according to the present exemplary embodiment and a process in which a pressure is balanced at the inside and outside of the sensor 100 will be described.

Figure 7A:
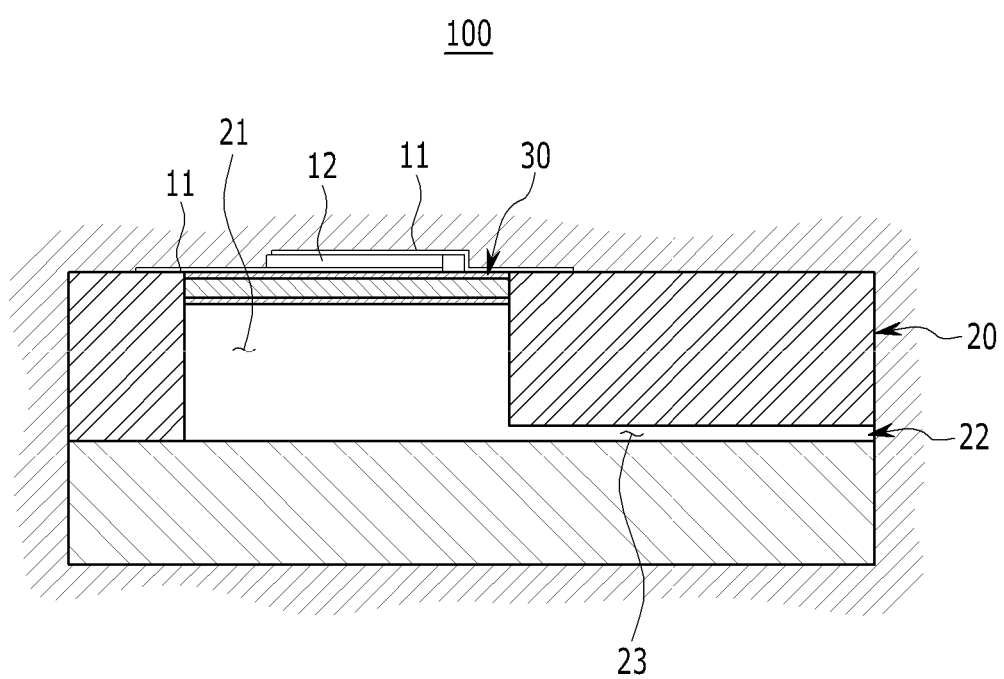
FIGS. 7A to 7C are cross-sectional views illustrating operation of a sensor according to an exemplary embodiment of the present invention.
Figure 7B:
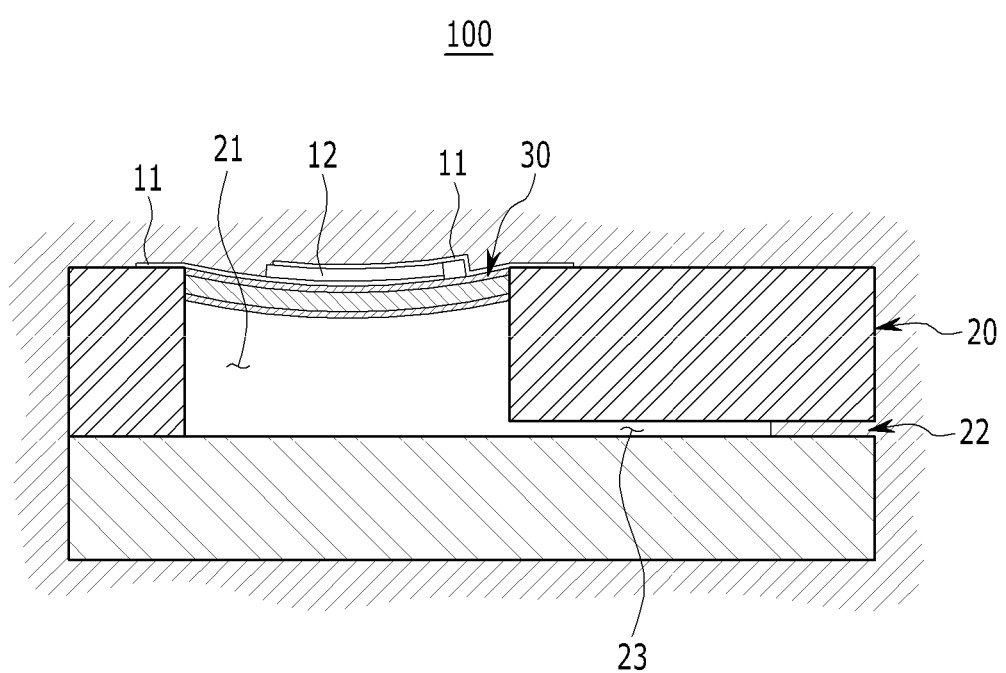
Figure 7C:
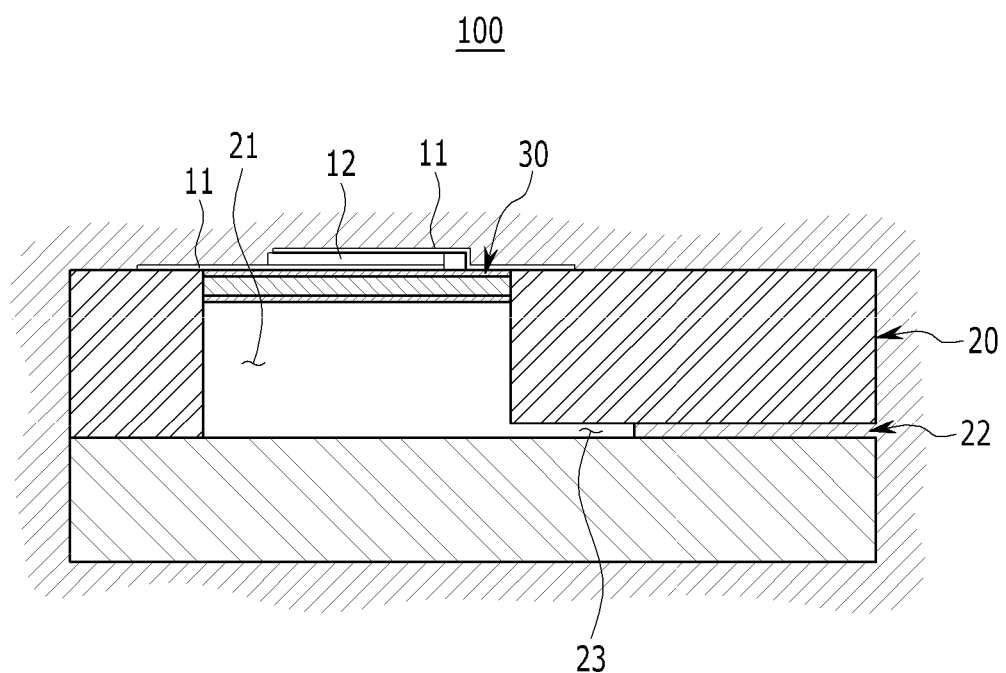

FIGS. 7A to 7C are cross-sectional views illustrating operation of a sensor according to an exemplary embodiment of the present invention. In FIGS. 7A to 7C, for convenience of description, a case where one chamber 21 is formed within the pressure balancing part 50 and a pressure balancing hole 22 is formed at a side surface of the pressure balancing part 50 is described, but such a configuration can be variously changed, as described above.

Referring to FIG. 7A, as described above, air is filled at the chamber 21 and the channel 23 of the sensor 100 according to an exemplary embodiment of the present invention, and the pressure balancing hole 22 is communicated with the outside of the sensor 100. An initial external pressure of the sensor 100 is sustained to $P_0$, and an internal pressure of the sensor 100 is also sustained to $P_0$ to be equal to an external pressure. In this case, at the inside of the sensor 100, an initial volume of air is $V_0$ and this is equal to the sum of a volume $V_c$ of the chamber 21 and a volume $V_{ch}$ of the channel 23.

$$V_0 = V_c + V_{ch} \qquad \text{(Equation 2)}$$

Thereafter, as shown in FIG. 7B, when an external pressure of the sensor 100 increases, the thin film diaphragm 30 of the pressure balancing part 50 is deformed due to a pressure difference between the inside and the outside of the sensor 100, and an external material, i.e., an incompressible fluid of the sensor 100 starts to inject into the inside through the pressure balancing hole 22.

Accordingly, an air volume decreases, and an internal pressure of the sensor 100 increases until being balanced with an external pressure P1. Further, the thin film diaphragm 30 is also deformed until an internal pressure and an external pressure of the sensor 100 are balanced.

Referring to FIG. 7C, when an internal pressure is balanced with an external pressure by reaching $P_1$, an air volume changes to $V_1$, as represented by Equation 3, and thus the thin film diaphragm 30 returns to an initial state.

$$V_1 = P_o V_0 / P_1 \qquad \text{(Equation 3)}$$

In order to improve sensitiveness by air charge, while an external pressure of the sensor 100 increases, an incompressible fluid should not be injected within the chamber 21 in which the piezoelectric element 12 is disposed at an upper part thereof and for this purpose, Equation 4 should be satisfied.

$$V_1 \geq V_c \qquad \text{(Equation 4)}$$

Accordingly, when a volume of internal space, except for the chamber 21 in which the piezoelectric element 12 is disposed at an upper part thereof should be fully large, and the sensor 100 can be used even under a high pressure. An internal volume V of the sensor 100 is the sum of a volume $V_c$ of the chamber 21 and a volume $V_{ch}$ of the channel 23. Further, referring to FIG. 4, the chamber 21 includes a main chamber 21$a$ in which the piezoelectric element 12 is disposed at an upper part thereof and other auxiliary chambers 21$b$, and the volume $V_c$ of the chamber is the sum of a volume of the main chamber and a volume of the auxiliary chamber. Therefore, in order to use the sensor 100 under a high pressure, the sum of a volume of the auxiliary chamber and the volume $V_{ch}$ of the channel should be fully large.

For example, when an internal volume V of the sensor 100 is 10 times greater than the volume $V_c$ of the chamber 21 at which the piezoelectric element 12 is disposed, the sensor 100 can be used under a pressure of about 10 times greater than an atmospheric pressure by Equations 3 and 4.

An incompressible fluid that is injected from the sensor 100 of the present exemplary embodiment into the channel 23 should not be affected by gravity. After a portion of the diaphragm 30 of a thin film is in a pressure balancing state, a pressure is balanced even in an interface between an incompressible fluid within the channel 23 and air, and this is because if the interface is affected by gravity, the interface between an incompressible fluid and air is collapsed and thus the incompressible fluid flows into the channel 23 to be injected into the chamber 21.

Accordingly, in the present exemplary embodiment, a radius of a channel is determined in consideration of a bond number, which is a dimensionless number representing a size of a gravity field influence to a size of a surface tension as follows.

$$Bo = \rho_b g R^2 / \rho \quad \text{(Equation 5)}$$

where $\rho_b$ is a density of an incompressible fluid, and g is acceleration of gravity (9.8 m/s$^2$), R is a radius of the channel 23, and σ is a surface tension of an incompressible fluid. In the present exemplary embodiment, air is used as a compressible gas, water is as an incompressible fluid, a density $\rho_b$ of water is 998 kg/m$^3$, and a surface tension a of water is 72.75 mN/m. If a value of the bond number Bo is greater than 1, an influence of gravity is greater than an influence of a surface tension, and if a value of the bond number Bo is smaller than 1, an influence of surface tension increases.

Therefore, in order to ignore an influence of gravity, compared with an influence of a surface tension, a radius R of a channel should be decreased. That is, when a radius R of a channel approaches 0, the bond number Bo also approaches 0. However, when a radius R of a channel is formed in a very small size, in order to sustain a volume of the inside of the sensor 100 in a predetermined level or more, a length of the channel should be formed fully long.

A radius R of the channel 23 can be formed in about 5 µm by a general micro processing, and in this case, the bond number Bo has a value similar to about 0 and thus an influence of gravity is very small.

In this way, by optimizing a size of constituent elements of the pressure balancing part 50 and the sensor 100 including the same according to an exemplary embodiment of the present invention, a sensitivity can be improved.

The pressure balancing part 50 can be integrally formed with the sensing part 10 including the electrode 11 and the piezoelectric element 12 in an MEMS process. By using such a micro processing process, while a sensitivity of the sound sensor 100 is improved, a production cost and time can be reduced.

Figure 8:
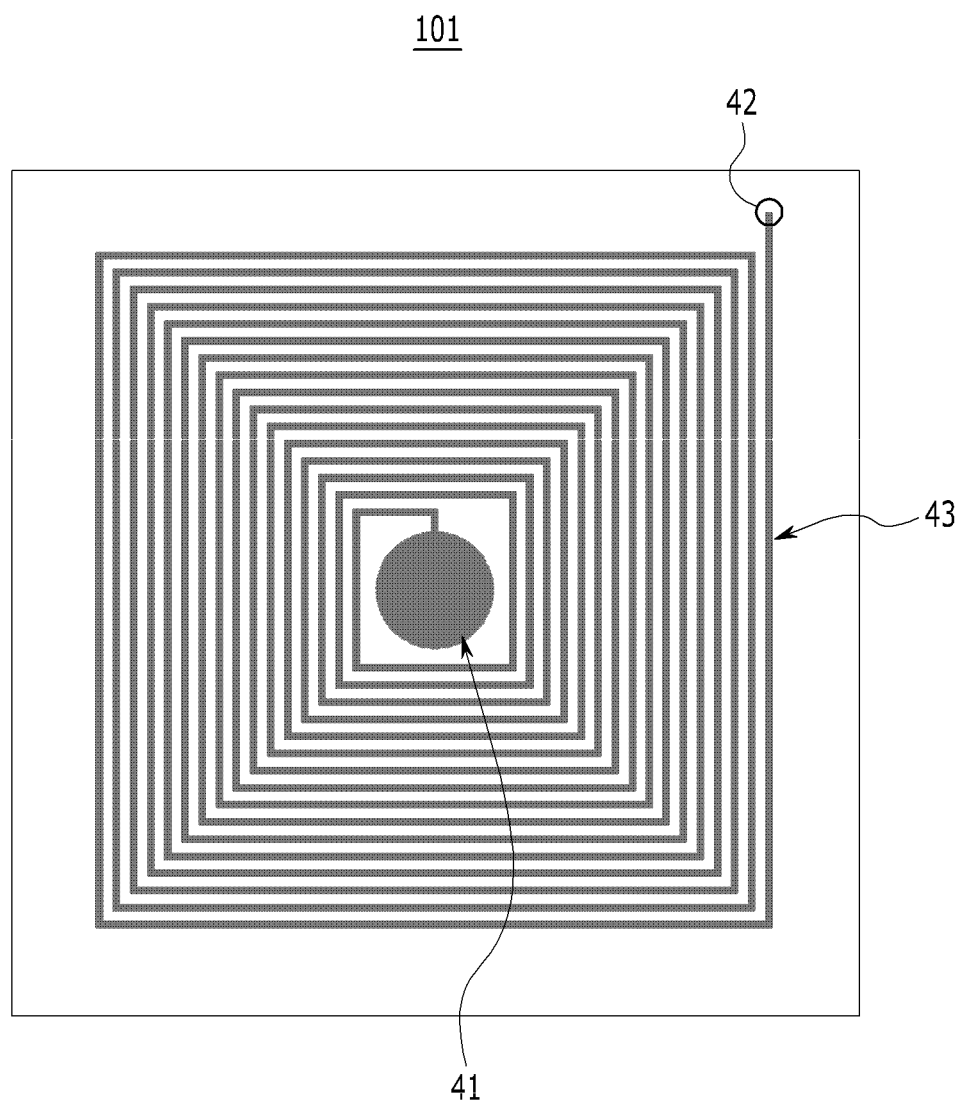
FIG. 8 is a bottom view illustrating a sensor according to an exemplary variation of a first exemplary embodiment of the present invention.

FIG. 8 is a bottom view illustrating a sensor according to an exemplary variation of a first exemplary embodiment of the present invention.

Referring to FIG. 8, in a pressure balancing part of a sensor 101 according to the present exemplary variation, a chamber 41, a pressure balancing hole 42, and a channel 43 that connects them are formed.

As described above, in order to use the sensor 101 under a high pressure, an internal volume of a pressure balancing part, except for a volume of a chamber at which a piezoelectric element is disposed should be large. For this purpose, in the present exemplary variation, by forming the channel 43 in a spiral form instead of forming an auxiliary chamber at the inside of the pressure balancing part, a length of the channel 43 is long formed, thereby largely forming an internal volume of the pressure balancing part.

In this way, in the pressure balancing device for using the sensor 101 under a high pressure, a shape of a chamber and a channel can be variously changed.

Figure 9:
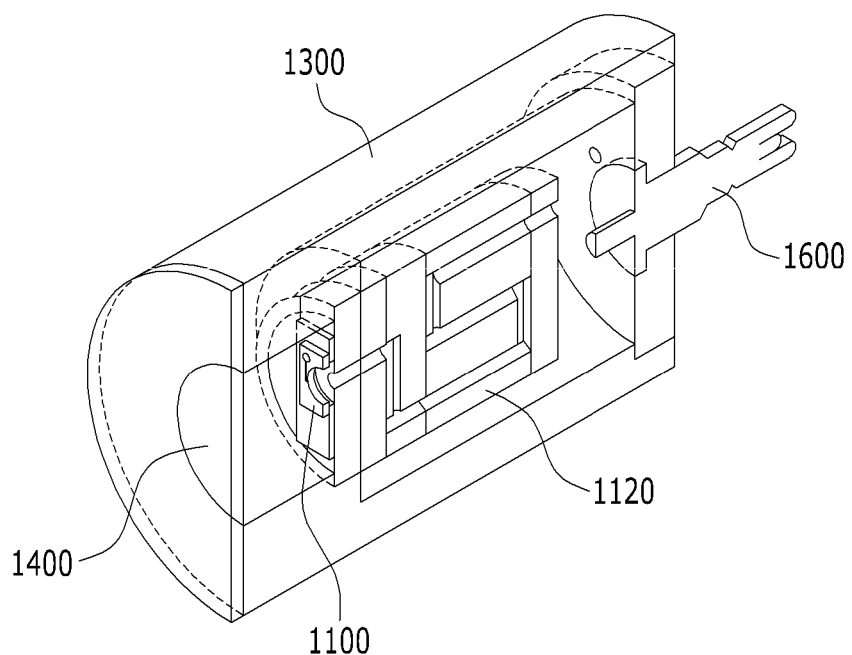
FIG. 9 is a cross-sectional perspective view illustrating a hydrophone according to a second exemplary embodiment of the present invention.

FIG. 9 is a cross-sectional perspective view illustrating a hydrophone according to a second exemplary embodiment of the present invention and hereinafter, a hydrophone according to a second exemplary embodiment of the present invention will be described with reference to FIG. 9.

Referring to FIG. 9, a hydrophone 1001 according to the present exemplary embodiment includes a sensor 1100, a PCB, a case 1300 that houses the sensor 1100 and the PCB, an elastic membrane 1400 that closes and seals an opening that is formed at one side of the case 1300, and a signal line 1600 that is extended to the outside of the case 1300.

Because the hydrophone 1001 according to the present exemplary embodiment shows a difference in a configuration of the sensor 1100 from the hydrophone according to the first exemplary embodiment, hereinafter, the second exemplary embodiment will be described with a configuration of the sensor 1100 and constituent elements identical to or similar to those of the first exemplary embodiment will be briefly described or will be omitted.

At the inside of the sensor 1100 according to the present exemplary embodiment, a channel is formed to inject an external material, i.e., an incompressible fluid, but only a main chamber having a piezoelectric thin film exists and a separate auxiliary chamber is not formed, unlike the first exemplary embodiment.

One end of a channel that is formed within a pressure balancing part 1120 is connected to a pressure balancing hole and the other end thereof is connected to a chamber of a lower part of a sensing part in which a piezoelectric element is formed. Accordingly, an external material, i.e., an incompressible fluid is injected along a channel under a high pressure to sustain a pressure balance between the inside and outside of the sensor 1100. In this case, in order to sustain a volume of the inside of the sensor 1100 in a predetermined level or more, a length and radius of the channel can be adjusted and thus the hydrophone 1001 can be used without damaging the sensor 1100 under a high pressure.

A non-conductive incompressible fluid such as castor oil is filled in internal space of the case 1300 in which the sensing part of the sensor 1100 is formed. When a change of an external pressure, i.e., an acoustic pressure generates, the acoustic pressure is transferred to the sensing part of the sensor 1100 via the elastic membrane 1400 and an incompressible fluid, and a piezoelectric element of the sensing part generates a current according to an applied pressure.

As a PCB is formed at a periphery of the sensor 1100, an electrical signal that is generated in the sensor 1100 is transferred to the PCB, and the electrical signal is again transferred to the outside through the signal line 1600 to detect a sound.

In the sensor 1100 according to the present exemplary embodiment, after the pressure balancing part 1120 is manufactured through a simple acryl processing, the pressure balancing part 1120 is attached to a sensing part, i.e., a piezoelectric element and an electrode that is manufactured through an MEMS process, whereby the sensor 1100 is formed.

Figure 10:
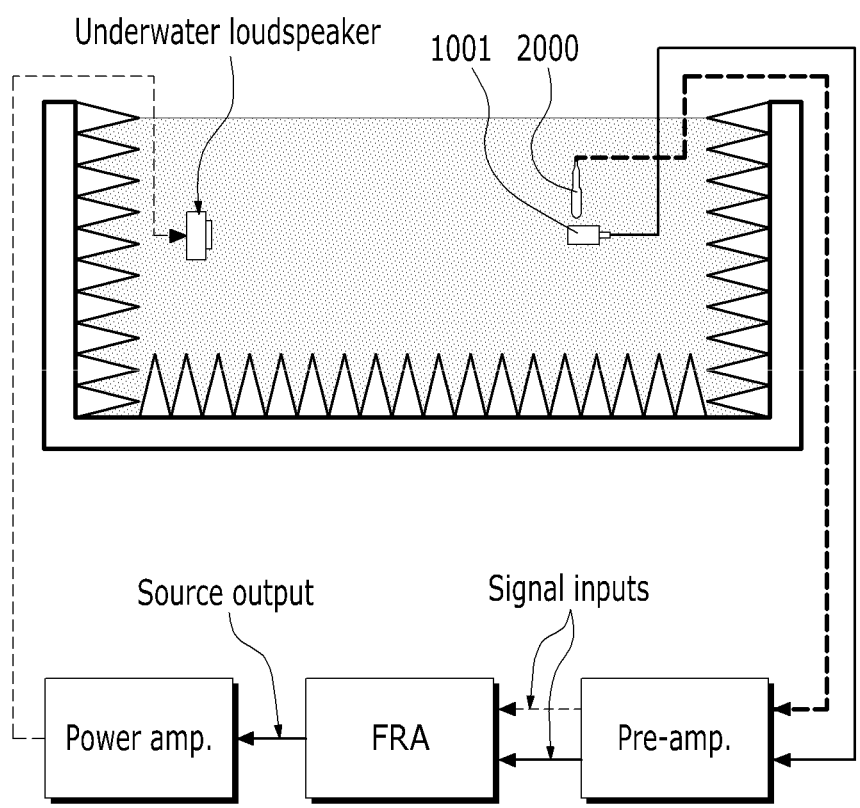
FIG. 10 is a diagram illustrating an experimental apparatus for testing a performance of a hydrophone according to a second exemplary embodiment of the present invention.
Figure 11A:
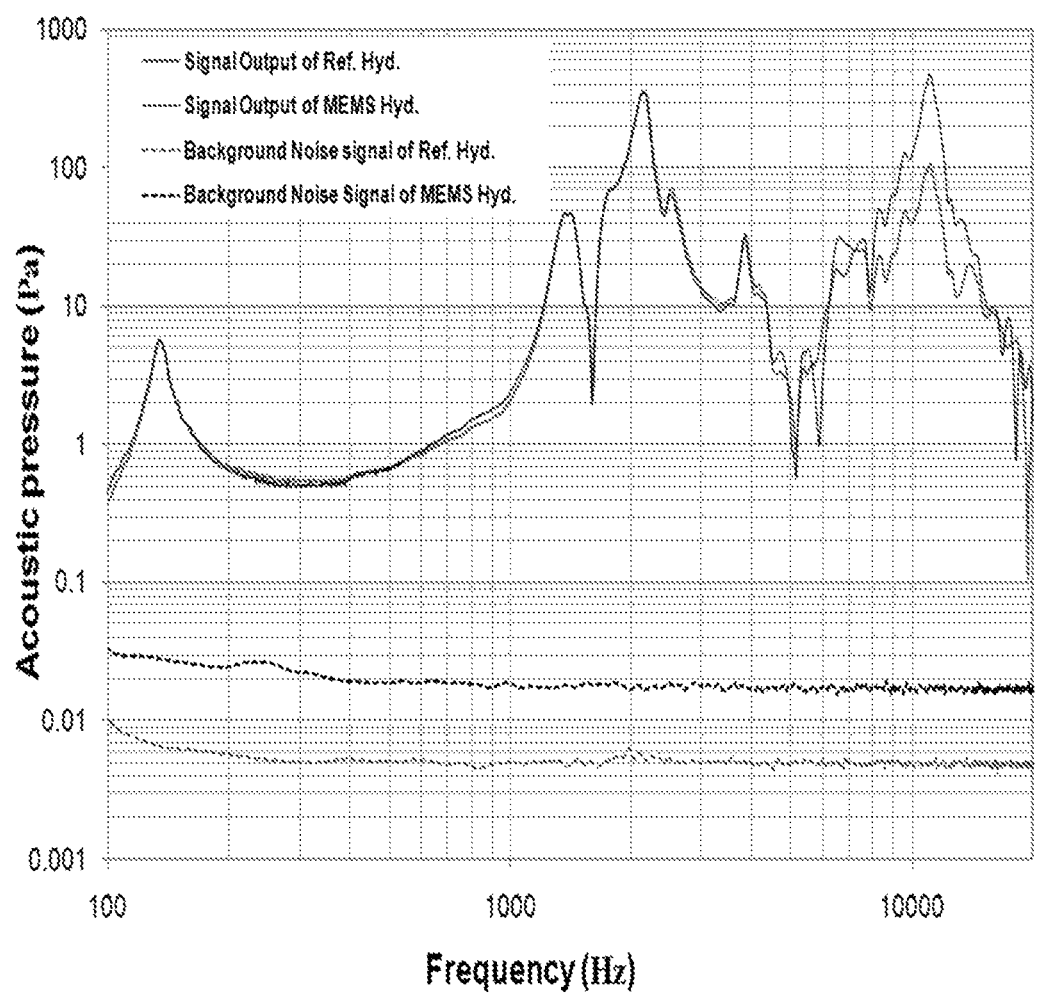
FIG. 11A is a graph illustrating frequency response characteristics of a hydrophone and a reference hydrophone according to a second exemplary embodiment of the present invention.
Figure 11B:
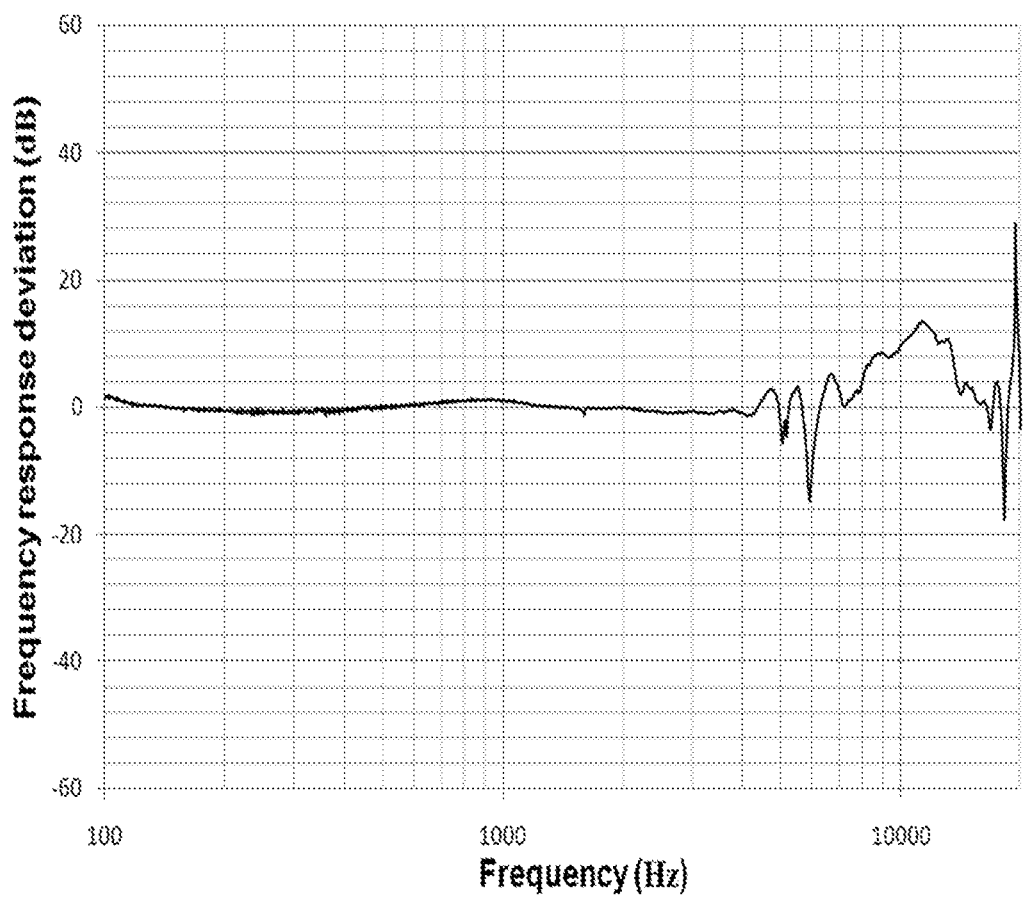
FIG. 11B is a graph illustrating frequency response characteristics of a hydrophone according to a second exemplary embodiment of the present invention to a reference hydrophone.

FIG. 10 is a diagram illustrating an experimental apparatus for testing a performance of a hydrophone according to a second exemplary embodiment of the present invention, FIG. 11A is a graph illustrating frequency response characteristics of a hydrophone and a reference hydrophone according to a second exemplary embodiment of the present invention, and FIG. 11B is a graph illustrating frequency response characteristics of a ratio of a hydrophone signal according to a second exemplary embodiment of the present invention to a reference hydrophone signal.

FIG. 10 illustrates an experimental apparatus for testing a performance of a hydrophone according to an exemplary embodiment of the present invention, and FIGS. 11A to 11B are graphs illustrating an experiment result.

Referring to FIG. 10, water of 20° C. is filled in a water tank and an underwater loudspeaker (EV-UW30) is fixed at the depth of water of 0.4 m. A reference hydrophone 2000 (B&K type 8103) for comparing a performance of the hydrophone 1001 according to the present exemplary embodiment is positioned at the depth of water similar to that of an underwater loudspeaker. A distance between two hydrophones 1001 and 2000 and the underwater loudspeaker is set to 1.1 m.

The underwater loudspeaker is connected to a power amplifier (NF HAS-4052), and the power amplifier is connected to a dynamic signal analyzer (FFT analyzer). Accordingly, the power amplifier amplifies a signal generating in the dynamic signal analyzer to transfer to the underwater loudspeaker and a sound wave is generated from the underwater loudspeaker toward the hydrophones 1001 and 2000.

A sound signal that is detected in the hydrophones 1001 and 2000 is transferred to the dynamic signal analyzer via a pre amplifier (B&K type 2692) and is used for analyzing a performance of the hydrophones 1001 and 2000 according to a frequency through the dynamic signal analyzer.

Referring to FIGS. 11A and 11B, the hydrophone 1001 according to the present exemplary embodiment shows frequency response characteristics very similar to those of the reference hydrophone 2000 in a low frequency range of 100 Hz to 5 kHz. However, in a frequency range of 6 kHz to 15 kHz, because a resonance frequency of the thin film sensor 1100 is designed to about 12 kHz, the hydrophone 1001 shows higher response characteristics than those of the reference hydrophone.

The reason that a deep valley is formed around 6 kHz of FIG. 11B is originated from an experiment condition such as a position difference of two hydrophones 1001 and 2000, a difference between refraction elements, and a multipath effect when a wavelength is short and is not originated from a sensitivity problem of the hydrophone 1001.

That is, as the hydrophone 1001 according to the present exemplary embodiment includes a pressure balancing part, the hydrophone 1001 can be operated in a high pressure and can prevent sensitivity deterioration even while being manufactured in a micro size through a micro processing.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydrophone comprising:
a sensor comprising a sensing part comprising a piezoelectric element and a pressure balancing part;
a printed circuit board (PCB) that is electrically connected to the sensor;
a case that houses the sensor and the PCB and that has an opening at one side thereof;
an elastic membrane that covers the opening of the case; and
a signal line that is electrically connected to the PCB and extended to the outside of the case,
wherein:

the pressure balancing part comprises a diaphragm of a thin film and a support that supports the diaphragm, a pressure balancing hole is formed at one side of the pressure balancing part, and at the inside of the pressure balancing part, a channel that is connected to the pressure balancing hole is formed,
the PCB partitions the inside of the case into a first space at which the sensing part of the sensor is disposed and a second space to which the signal line is connected,
a compressible gas is filled in the channel, and
a first incompressible fluid is filled at the first space, and a second incompressible fluid is filled at the second space, and
wherein the first incompressible fluid is a liquid and surrounds the diaphragm and the support at least a portion where the pressure balancing hole is formed, and the first incompressible fluid is allowed to be injected into the pressure balancing hole to form an interface with the compressible gas while the first incompressible fluid presses the diaphragm.

2. The hydrophone of claim 1, wherein the compressible gas is air.

3. The hydrophone of claim 1, wherein the first incompressible fluid is a non-conductive liquid.

4. The hydrophone of claim 3, wherein the first incompressible fluid is castor oil.

5. The hydrophone of claim 1, wherein the second incompressible fluid is distilled water (DI water).

6. The hydrophone of claim 1, wherein at the inside of the pressure balancing part, a chamber is formed at a position corresponding to the piezoelectric element, and
the channel connects the chamber and the pressure balancing hole, and
the compressible gas is filled in the chamber.

7. The hydrophone of claim 6, wherein the channel is formed in a spiral form that winds a periphery of the chamber.

8. The hydrophone of claim 6, wherein the chamber comprises a main chamber and at least one auxiliary chamber,
the channel connects the main chamber, the at least one auxiliary chamber, and the pressure balancing hole, and
the piezoelectric element is positioned to correspond to the main chamber.

9. The hydrophone of claim 1, wherein:
the piezoelectric element is disposed on the diaphragm,
the sensing part further comprises an electrode that is connected to the piezoelectric element, and
the electrode is separated by the piezoelectric element interposed therebetween to contact with an upper surface and a lower surface, respectively, of the piezoelectric element.

10. The hydrophone of claim 9, wherein the electrode of the sensing part is electrically connected to the PCB.

11. The hydrophone of claim 1, wherein the diaphragm comprises a silicon layer.

12. The hydrophone of claim 11, wherein the diaphragm further comprises a silicon oxide film that is formed at both surfaces of the silicon layer.

13. The hydrophone of claim 1, wherein a radius of the channel satisfies the following Equation, $$\rho_b g R^2 / \sigma < 1$$

where $\rho_b$ is a density of the second incompressible fluid, g is acceleration of gravity, and $\sigma$ is a surface tension of the second incompressible fluid.

14. The hydrophone of claim 1, wherein the elastic membrane is formed with silicon rubber.

15. The hydrophone of claim 1, wherein an auxiliary membrane is formed at a periphery of the PCB.

16. The hydrophone of claim 1, wherein the sensing part and the pressure balancing part are integrally formed.

* * * * *